Figure 6:
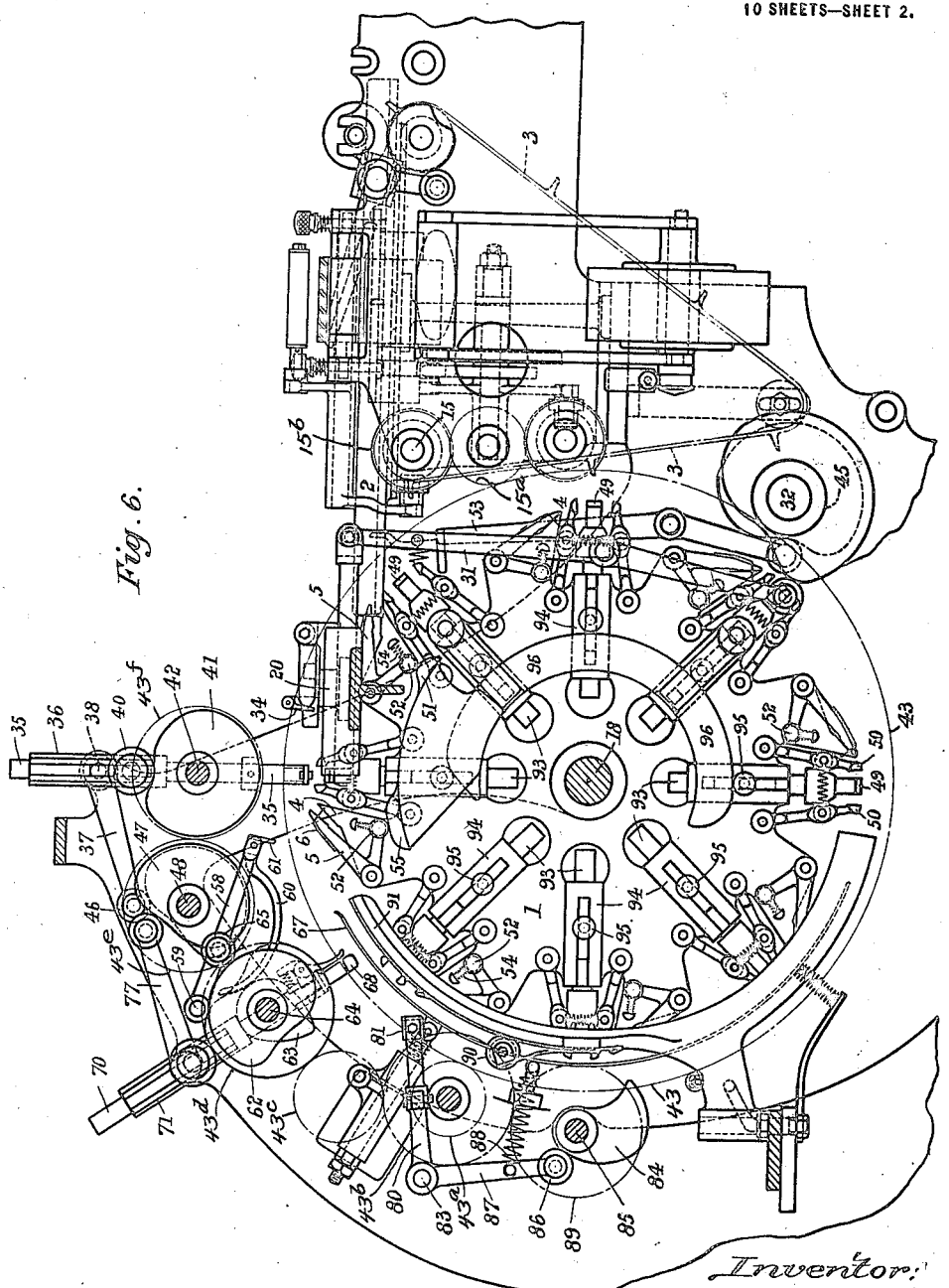

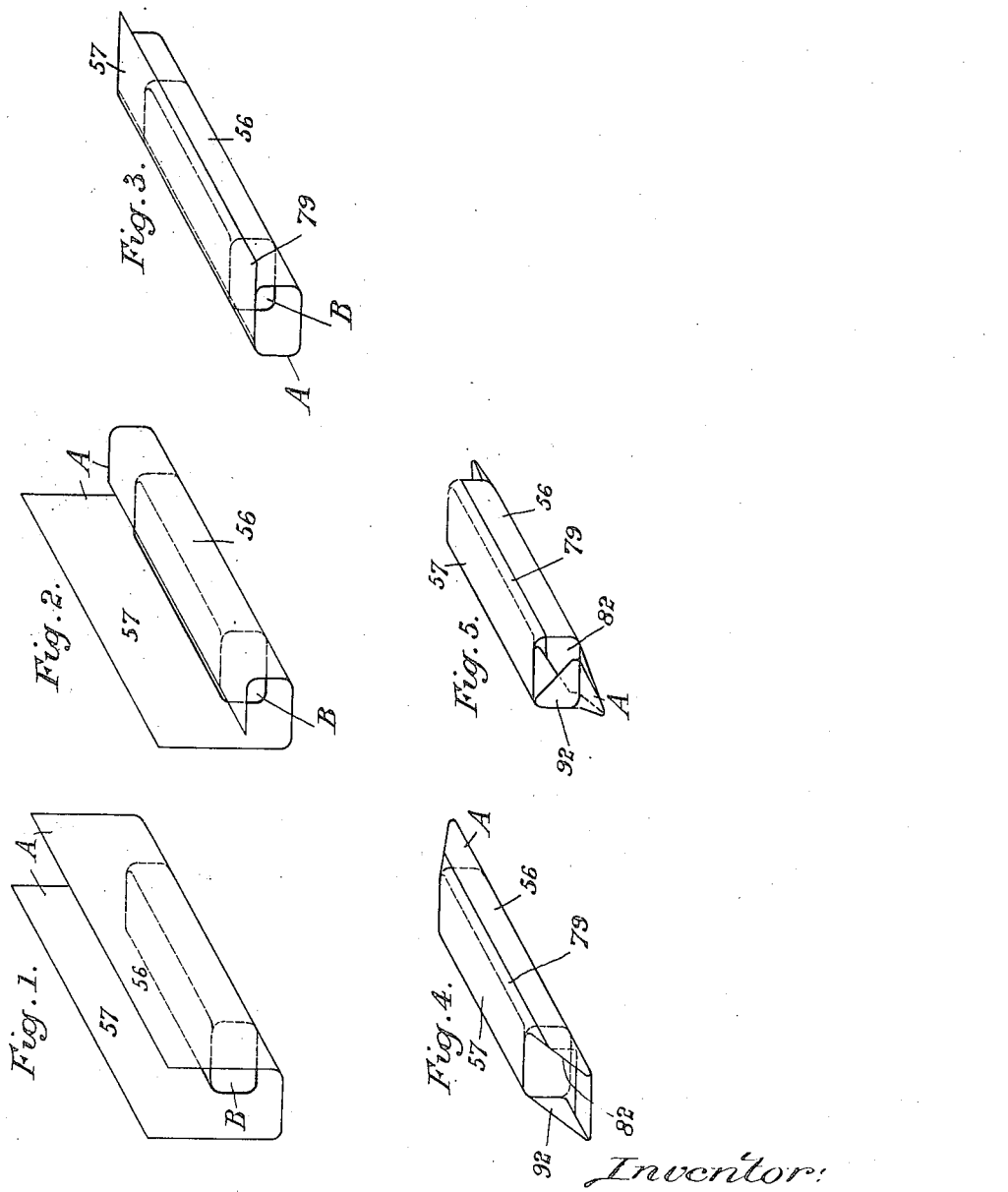

Inventor: HENRY ROSE, DECEASED
WILLIAM HENRY ROSE, ADMINISTRATOR.
ATTORNEYS

H. ROSE, DEC'D.
W. H. ROSE, ADMINISTRATOR.
WRAPPING MACHINE.
APPLICATION FILED JAN. 13, 1921.

1,434,152.

Patented Oct. 31, 1922.
10 SHEETS—SHEET 4.

Fig. 8.

Inventor:
HENRY ROSE, DECEASED,
WILLIAM HENRY ROSE, ADMINISTRATOR.

ATTORNEYS

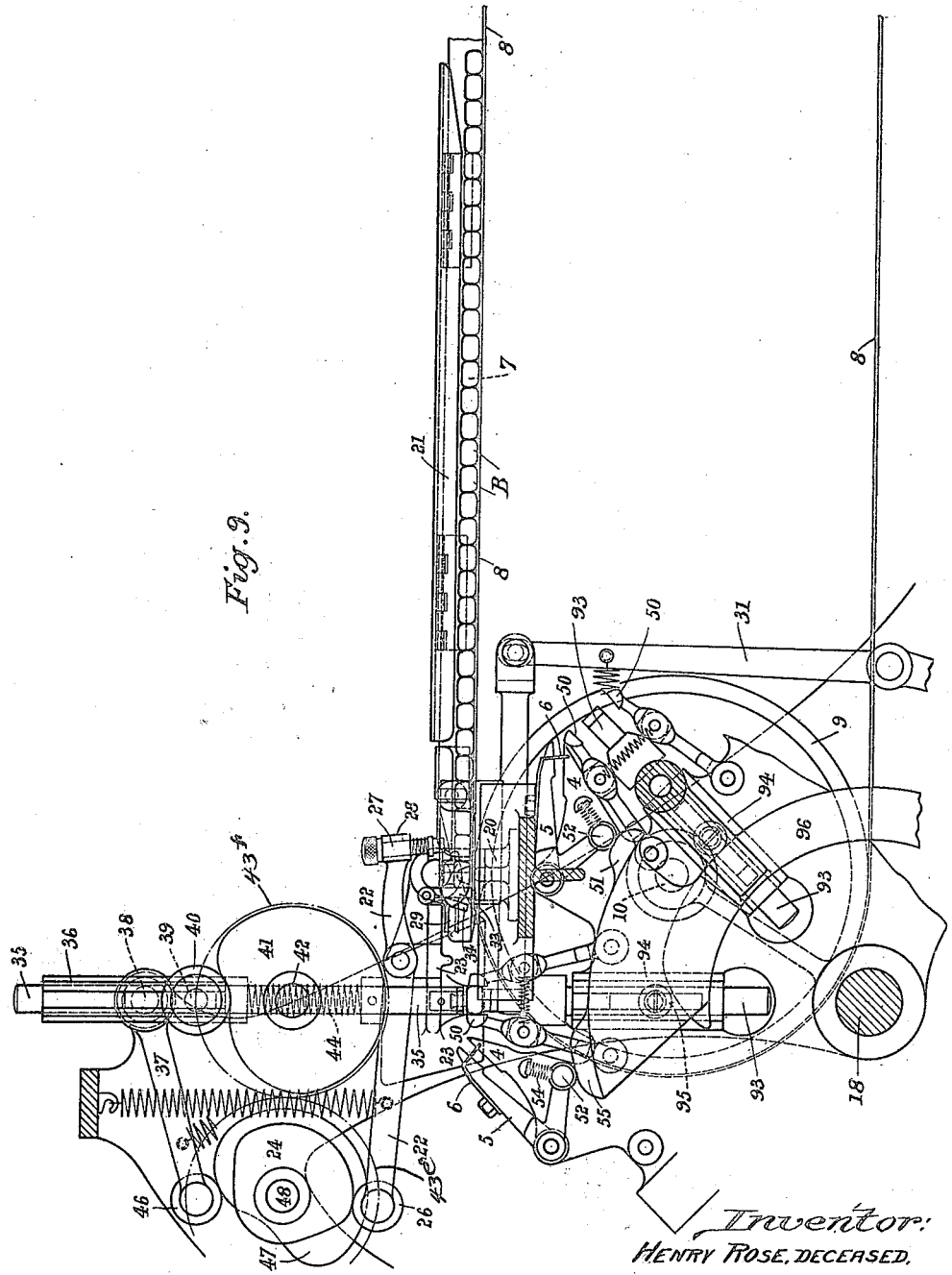

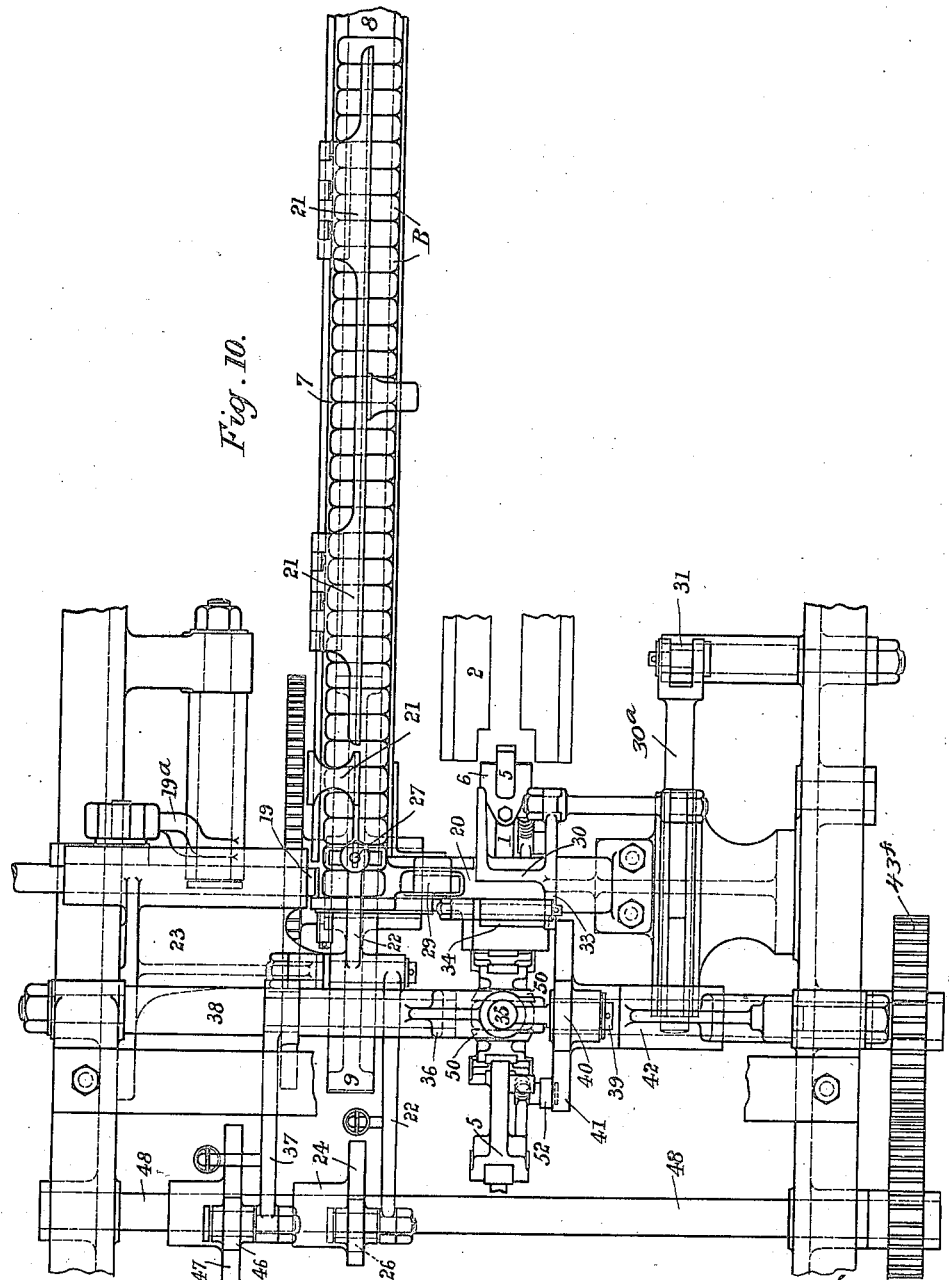

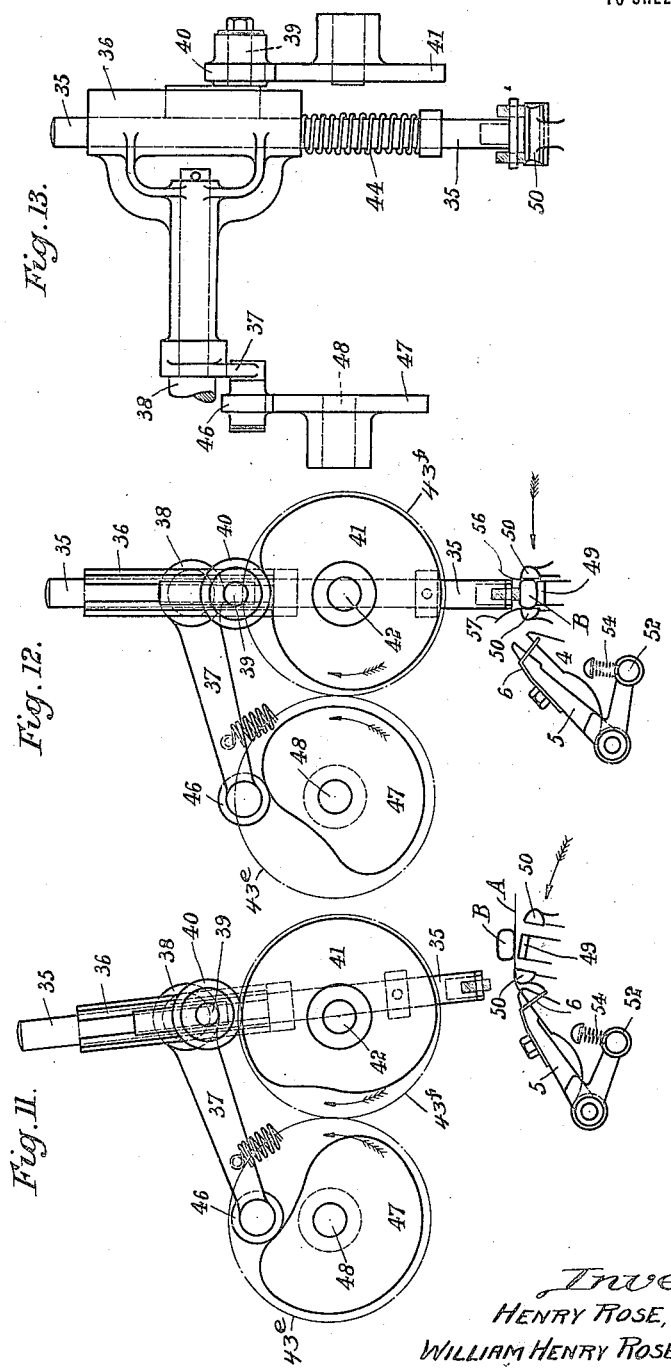

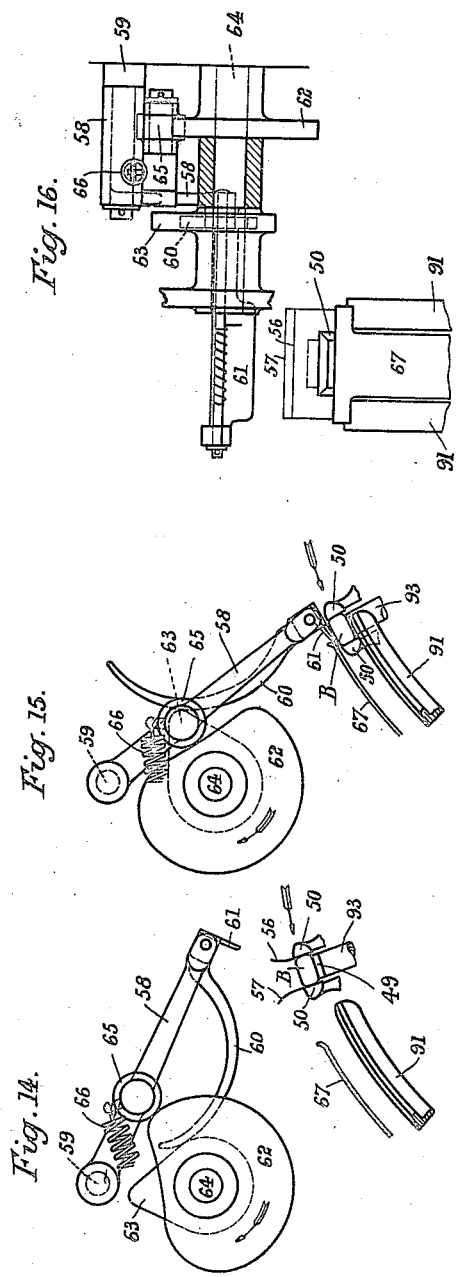

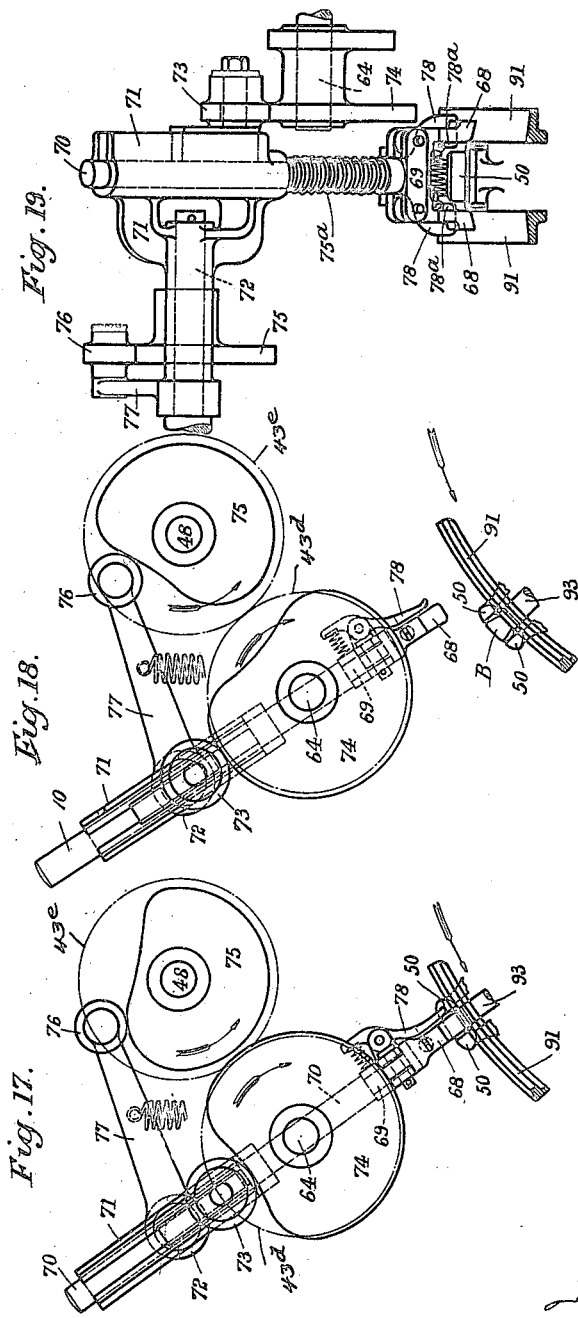

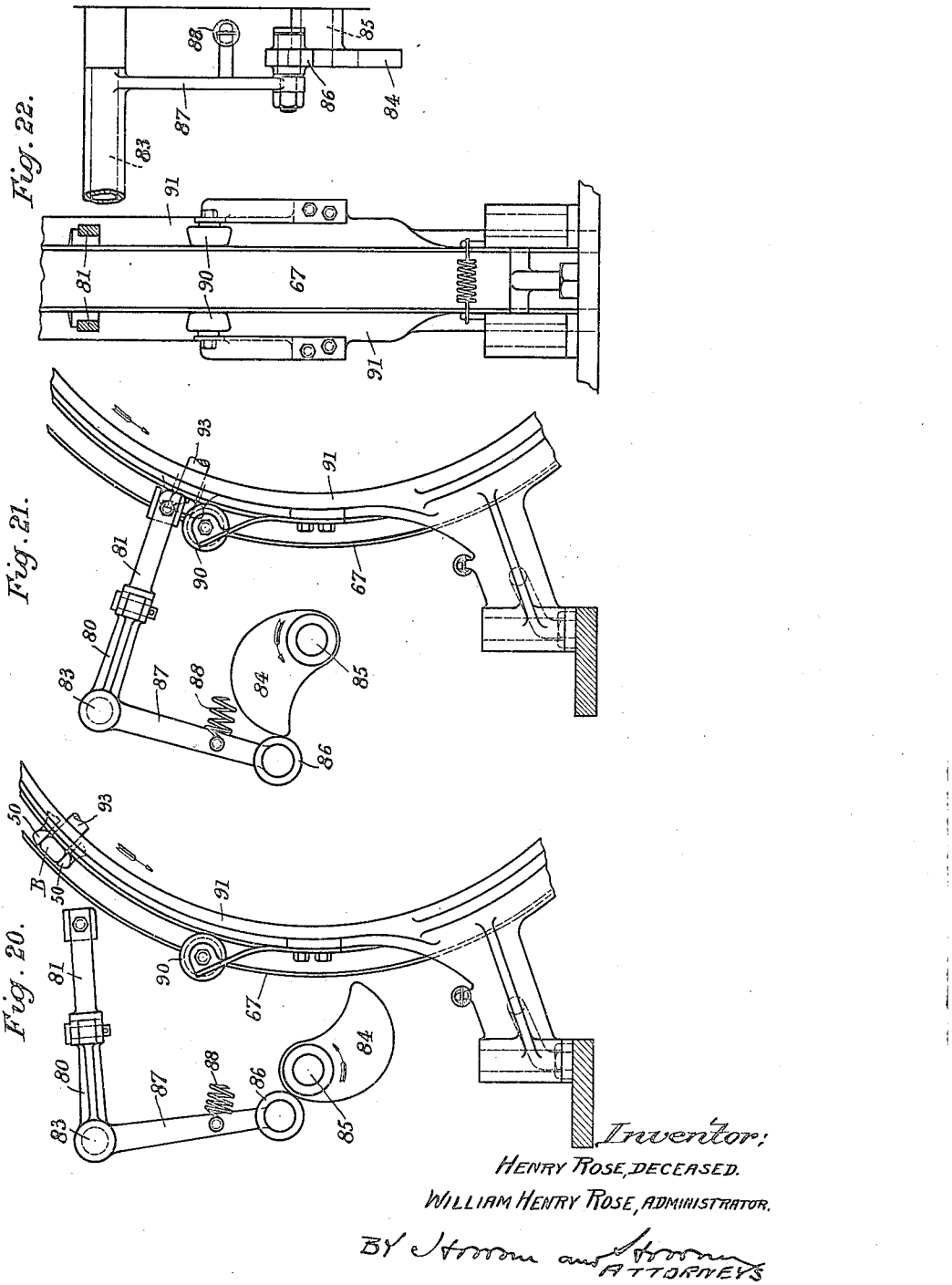

Patented Oct. 31, 1922.

1,434,152

UNITED STATES PATENT OFFICE.

HENRY ROSE, DECEASED, LATE OF GAINSBOROUGH, ENGLAND, BY WILLIAM HENRY ROSE, ADMINISTRATOR, OF GAINSBOROUGH, ENGLAND.

WRAPPING MACHINE.

Application filed January 13, 1921. Serial No. 437,025.

*To all whom it may concern:*

Be it known that HENRY ROSE, deceased, a subject of the King of Great Britain, and resident of Albion Works, Gainsborough, in the county of Lincoln, England, invented certain new and useful Improvements in Wrapping Machines, of which the following is a specification.

This invention consists in an improved machine of the kind described and illustrated in the specifications of British Letters Patents No. 20183 A. D. 1900, and No. 6769 A. D. 1905, apparatus of this kind being designed more especially for use in wrapping such sweetmeats as blocks, or slabs, of chocolate, and the object of the present invention is to so modify the said apparatus as to adapt it for use in securely wrapping sweetmeats, or analogous articles, which are in the form of blocks, or slabs, with rounded edges and corners and are of such a nature as to be more liable to adhere together than is the case with blocks, or slabs, of chocolate, and the like.

In the apparatus of the said former patents the blocks, or slabs, are placed in a trough, the bottom of which is constituted by an endless travelling band, or by endless travelling bands, which carry each block, or slab, (which we will refer to as the chocolate), in succession into position to be transferred, by a rocking arm, into a channel from which the chocolates are pushed by another arm, or lever, onto wrappers as they are brought by the rotation of a mould-wheel into position to receive the chocolate which, together with the wrappers, are then forced into moulds, or recesses, (with movable sides and bottoms) in the periphery of the mould-wheel, to which mould-wheel intermittent movements of partial rotation are imparted from the main shaft of the apparatus. The construction of such machines according to the present invention, render such apparatus capable of dealing satisfactorily with articles of the character aforesaid having rounded edges and corners and also possibly being of a nature liable to adhere to each other, the improved machines comprising improved means for feeding the articles to be wrapped (which we will refer to as bonbons) to the mould-wheel and improved means for effecting the wrapping of the bonbons, as hereinafter described, whereby the ends of the last horizontal top fold of the wrapper are engaged, or interlocked, with the end folds, so that the folds are kept in place and effect a secure wrapping of the bonbons, the improved feeding means effecting the feeding in such a manner that the bonbons, on their way to the mould-wheel, are kept in correct position and are eventually very securely and evenly wrapped in their wrappers.

We will describe with reference to the accompanying drawings, the construction of a machine in accordance with this invention.

Figure 7:
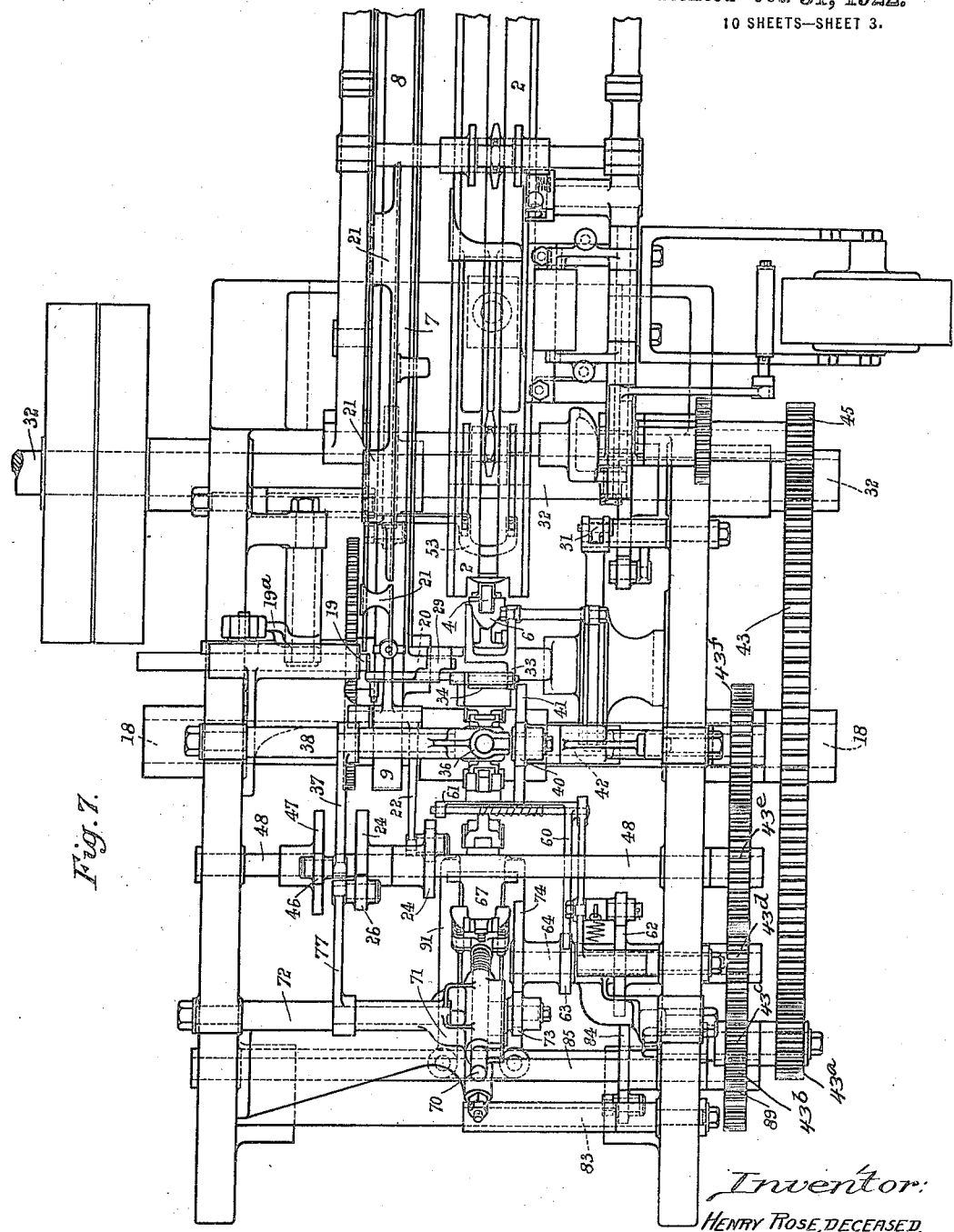

Figures 1, 2, 3, 4 and 5, shew, in perspective, progressive stages of the wrapping; Figure 1 shewing the wrapper round three longitudinal sides of a bonbon, Figure 2 shewing the first top longitudinal fold, Figure 3 shewing the second top longitudinal fold, Figure 4 shewing the first end fold and Figure 5 shewing the second end fold. Figure 6 is a side elevation, Figure 7 is a plan and Figure 8 is an elevation as seen from the side opposite to that shewn in Figure 6, of an apparatus in accordance with this invention. Figure 9 is a side elevation and Figure 10 is a plan of the apparatus for feeding the bonbons to the mould-wheel shewn in Figures 6, 7, and 8. Figures 11 and 12 illustrate, respectively, the relative positions of the parts when a bonbon and its wrapper are being fed to the mould-wheel and when the said bonbon and wrapper are being pushed into the mould, respectively. Figure 13 is an end view of Figure 12. Figure 14 is a view shewing the bonbon and wrapper advancing towards a stationary folder which effects the second top longitudinal fold. Figure 15 is a view shewing the folders folding the first and second top longitudinal folds of the wrapper. Figure 16 is an end view of Figure 14. Figures 17 and 18 shew the first end folder and pressing finger in their operative and inoperative positions, respectively. Figure 19 is a view at right angles to Figure 17. Figures 20 and 21 shew the second and third end folders in their inoperative and operative positions, respectively, and Figure 22 is a view at right angles to that shewn in Figure 20.

The wrappers A, in which the bonbons B, are to be enclosed are fed, by an endless band 3, towards the mould-wheel 1, along a trough 2, in the manner described in the specifications of the aforesaid patents; each wrapper as it reaches the end of the trough 2 being engaged by a gripping device 4 on the mould-wheel 1, each gripping device comprising a fixed jaw and a movable jaw turning on a stud on the mould-wheel 1 and having an arm provided with a roller acted upon by a spring tending to maintain the jaws closed, the said movable jaw being opened at the proper times, to admit the forward end of the wrapper as it is passing from the trough 2. In the apparatus according to the present invention and as shewn more particularly in Figures 9 and 10 of the accompanying drawings we provide the known arrangement of a movable jaw 5 of the gripping device 4 with an abutment, or stop, 6 to determine the position of the wrapper A relatively to the mould. The mould with the wrapper is then, by the movement of the mould-wheel, brought into position to receive a bonbon B to be enclosed in the wrapper A.

The bonbons B are, as described in the specifications of the aforesaid patents, placed in a trough 7, the bottom of which is constituted by an endless travelling band 8 passing round pulleys one, 9 of which is shewn in the drawings mounted on a shaft 10 and intermittently partially rotated by a pawl 11 (see Fig. 8) on a lever 12 loosely mounted on the shaft 10 the said pawl engaging a ratchet-wheel 13 secured to the said shaft. The lever 12 is operated by a roller 16 eccentrically mounted on a disc 14 secured to a shaft 15 which, roller 16, actuates an arm 17 formed in one with the said lever 12. Rotary motion is transmitted from the mould wheel shaft 18, to the shaft 15 by a toothed wheel 43, secured to the said shaft 18, which rotates, through a toothed pinion 15$^a$, a toothed wheel 15$^b$ secured to the said shaft 15. The partial rotation of the pin 9 is timed so as to carry each bonbon in succession into position to be transferred by a reciprocating plunger 19, operated by a rocking arm 19$^a$, from the endless band 8 into a channel 20 arranged at right angles to the direction of motion of the said endless band. The rocking arm 19$^a$ is actuated at the proper times by a face cam 19$^b$, secured to the main driving shaft of the apparatus which engages with the antifriction roller 19$^c$, on the lower end of the arm 19$^a$.

In the machine constituting the present invention and as more particularly illustrated in Figures 9 and 10 of the accompanying drawings, guards 21 are provided to act to prevent the bonbons rising in the trough 7, and means are provided for retaining, or retarding, the bonbons and preventing a forward bonbon adhering to the bonbon next in succession whilst the said forward bonbon is moved towards the mould-wheel, the said means consisting of an arm 22, pivotally mounted on a bracket 23, secured to the frame of the apparatus, which arm is, whilst the forward bonbon is being pushed towards the mould-wheel, caused to bear upon the upper face of the next succeeding bonbon, this being effected by a cam 24, secured to a shaft 48, and bearing upon an antifriction roller 26 carried by the said arm. The end of the said arm is preferably provided with a resilient bearing-piece to prevent the bonbons being damaged and to allow for variation of the thickness of the bonbons which resilient bearing-piece may consist of a spring-pressed plunger, or stem, 27 movable in a socket-piece 28 on the end of the arm 22, as shewn in Figure 9 of the accompanying drawings.

Each bonbon is, in accordance with this invention, when pushed from the trough 7 into the channel 20 by the reciprocating plunger 19, prevented from adhering to the said plunger by a hinged piece 29 which bears, by gravity, upon the upper face of the bonbon and to further prevent such adherence the bearing end of the pusher may be recessed, or equivalently formed, so that only its edges, or a small portion of the said end will bear against the bonbons.

The bonbons in succession are pushed from the channel 20 by a reciprocating plunger 30 operated by an arm, or lever, 31 which may be actuated by any suitable means from the main shaft 32 of the apparatus. The side of the channel 20 opposite the plunger 30 is constituted by a hinged-piece, or, gate, 34 which acts, in conjunction with the plunger 30, to maintain the foremost bonbon in correct position as it advances towards the mould; a projection 33 on the said plunger 30 engaging with and turning the said hinged piece, or gate, out of the path of the said bonbon as it is being pushed by said plunger into position to be operated by a succeeding plunger 35.

The plunger 35, by which the bonbons and the wrappers are forced into the moulds, is slidably mounted in a socket 36 formed in one with an arm 37 pivotally mounted on a stud 38. A stud 39 projects from the plunger 35, through a slot in the socket 36 on which stud is an antifriction roller 40 bearing on a cam 41, secured to a shaft 42, having a toothed wheel 43$^f$ secured thereto which is rotated, through a train of toothed wheels, 43$^a$, 43$^b$, 43$^c$, 43$^d$ and 43$^e$, from a toothed wheel 43 on the shaft 18 of the mould-wheel 1, rotated by a pinion 45 on the main shaft 32. The cam 41 is timed to act in conjunction with a spring 44 to cause the plunger 35 to slide, at the proper times, to and fro, in the socket 36 to press the bonbon into the mold. The arm 37 carries an antifriction roller 46 (see more particularly Figures 11, 12 and 13) which bears on a cam 47, on a shaft 48 to which is secured one (43ᵉ) of the said train of toothed wheels. The cam 41, acts through the arm 37 to cause the socket 36 to swing so that the plunger 36 follows the path of the bonbon, which is in position, with a wrapper, on the movable bottom 49 of the mould, which bottom is, at this time, level with, or slightly above, the top edge of the movable sides 50 of the said mould. At the time that the plunger 35 is over the bonbon, the cam 47 allows the spring 44 to press the said bonbon and the bottom 49 of the mould downwards, the said plunger pressing the bonbon, together with the wrapper, into the mould as it passes beneath the socket 36, as shown in Figure 12, the wrapper being at this time disengaged from the gripping device 4 on the mould-wheel 1 by which gripping device the wrapper was engaged to bring it into position to receive the bonbon. The engagement of the wrappers by the jaws 5 of the gripper is effected by a stationary projection 51 (see Figures 6 and 9) on the frame of the apparatus against which projection an anti-friction roller 52 on the tail of each movable jaw 5 comes into contact as the mould-wheel rotates, so as to open the said movable jaw to receive the edge of the wrapper as it is brought forward by the lever 53, the said jaw being closed by a spring 54 when the anti-friction roller 52 passes the projection 51. The jaw remains closed while the mould wheel is moving to bring the wrapper into position to receive the bonbon and just as the said bonbon is being pressed into the mould, the antifriction roller 52 comes into contact with another stationary projection 55 which causes the jaw to open and release the wrapper. After passing the projection 55 the jaw closes and remains closed until it again comes into contact with the projection 51, all in accordance with the aforesaid former patents, and likewise in accordance therewith by the insertion of the wrapper and bonbon into the mould two opposite ends 56 and 57 of the wrapper are caused by the sides of the mould to stand up above the top surface of the bonbon as shown in Figure 1 and Figure 12 of the accompanying drawings. As the mould-wheel continues to rotate, the rear upstanding end 56 of the wrapper is folded onto the bonbon by a folding device comprising an arm 58 (see Figures 14, 15 and 16) mounted on a stud 59 projecting from the frame of the apparatus on which arm is pivoted another arm 60 carrying the folding blade 61 the arm 58, carrying the folding blade 61, is caused to oscillate on the stud 59 by cams 62 and 63 on a shaft 64 to which is secured the toothed wheel 43ᵈ to which rotary motion is transmitted from the toothed wheel 43 on the mould wheel shaft 18 by the train of toothed wheels 43ᵃ, 43ᵇ, and 43ᶜ. The arm 58 carries an anti-friction roller 65 which is caused to bear on the cam 62 by a spring 66 and the two cams 62 and 63 are timed so that when the anti-friction roller 65 is on the lowest part of the cam 62 the folding blade 61 has partially folded the end 56 of the wrapper onto the bonbon, the cam 63 will act on the arm 60 and turn the blade 61 on its pivot whereby the said end 56 is laid onto the bonbon, as shewn in Figure 2 of the accompanying drawings, the said arm being then caused, by the cam 62, to oscillate in the reverse direction and become clear of the wrapper. A guard 67 is arranged to partially surround the mould-wheel against one end of which, as the mould wheel 1 rotates, the other upstanding end 57 of the wrapper comes into contact and is thereby folded onto the end 56 previously folded onto the bonbon as shown in Figure 3 of the accompanying drawings, and in accordance with the arrangement of the aforesaid prior patents.

The first end-folds of the two laterally projecting ends of the wrapper are effected by a folding device which acts to press the said ends onto a concentric plate, or guard, 91 (see Figures 17, 18 and 19 of the accompanying drawings) carried in any suitable manner by the frame of the apparatus. The said folding device is illustrated as being similar in construction, and as being operated in a manner similar to that by which the bonbon and wrapper are forced into the mould, the said folding device being however provided with yielding fingers 68 which will permit of the said device acting on bonbons of slightly different sizes. The yielding fingers 68 are hinged to a cross-head 69 on a rod 70 slidable in a socket 71, mounted on a stud 72, projecting from the frame of the apparatus, the said rod 70 carrying an antifriction roller 73 which is caused, by a spring 75ᵃ, to bear on a cam 74, secured to the shaft 64, which effects the reciprocation of the said rod at the proper times. The socket 71 is oscillated on the stud 72 by a cam 75, secured to the shaft 48, which actuates, through an antifriction roller 76, an arm 77 formed in one with the socket 71 these being in accordance with the aforesaid prior patents, but in accordance with the present invention there is pivotally mounted on, and reciprocable with, the crosshead 69 a blade 78, which, upon the descent of the end-folding devices, acts to fold a projecting portion 79 of the end 57 of the wrapper onto the side of the bonbon, as shown in Figure 4 of the accompanying drawings, which portion 79 acts to more securely maintain the wrapper round the bonbons when the folding is completed. The movable side 50 of each mould adjacent to the blade 78, is of less length than the length of the partially wrapped bonbon, to permit the side portions 78ᵃ of the said blade to engage with the projecting portion 79, of the wrapper and press the end portions thereof against the side of the bonbon.

The first end fold of the laterally projecting ends of the wrapper having been made, the second end folds of the said laterally projecting ends 82 are made as the mould wheel continues to rotate by oscillating arms 80 carrying at their ends folding blades 81, as shewn in Figures 20, 21 and 22, of the accompanying drawings, the said arms being caused to engage, at the proper time, with the said projecting ends 82 of the wrapper and fold it onto the first end-fold. Each arm 80 constitutes one arm of a bell-crank lever mounted on a stud 83 and is caused to oscillate by a cam 84, secured to a rotatable shaft 85, and bearing upon an antifriction roller 86, on the other arm 87 of the said bell-crank lever. A spring 88, connected to the arm 87 and to any suitable fixed part of the apparatus, maintains the roller 86 in engagement with the cam 84. Secured to the shaft 85 is a toothed wheel 89 to which rotary motion is transmitted from the toothed wheel 43 by the toothed wheels 43$^a$ and 43$^b$ of the train of toothed wheels hereinbefore mentioned.

The third end folds of the laterally projecting ends is effected by spring-pressed rotatable rollers 90 (preferably of conical shape) carried by the before mentioned concentric plate, or guard, 91, between the periphery of which rollers and the periphery of the said concentric plate, or guard, the portions 92 of the said ends are folded as the partially wrapped bonbon is carried round by the mould-wheel.

The wrapped bonbons are ejected from the moulds by the movable bottoms 49 being caused to slide radially outwards in the mould, thereby forcing the said bonbons out of the moulds onto a chute, or travelling band, or the like. Each of the movable bottoms 49 of the moulds is provided with stems 93 adapted to slide in radial sockets 94 in the mould-wheel and each is provided with an anti-friction roller 95 which, as the mould-wheel rotates, is caused to run onto a stationary cam 96 which is shaped to effect, at the proper times, the raising and lowering of the said movable bottoms.

We have described and illustrated many of the parts of the apparatus of the prior patents aforesaid, in order to make clear the improvements which are the subject of the present invention and the portions of the machine to which they apply and the manner and object of their action but it is to be understood that, under our present application, we make no claim to anything described, or shewn, in the specifications of either of the said prior patents.

Having now particularly described and ascertained the nature of our said invention, and in what manner the same is to be performed, we declare that what we claim is:

A machine for enclosing in wrappers material in the form of blocks, the said machine consisting of a frame, a feeding trough, with a travelling bottom, guards for controlling the blocks as they travel in the said trough, a channel, a mould-wheel, means for supplying wrappers towards the moulds, means for transferring the blocks from the trough to the channel, and thence, with a wrapper, to a mould in the mould wheel, a device to bear upon the blocks as they are passed towards the moulds, means for effecting the wrapping of the blocks so that the ends of the last horizontal top-fold of the wrapper are securely engaged with the end-folds, the folding devices including yielding fingers hinged to a crosshead carrying a blade operable to fold a projecting portion of the end of the wrappers onto the side of the block, and, for the moulds, a movable side of less length than the blocks, all substantially as hereinbefore described.

In testimony whereof I have signed my name to this specification in the presence of two subscribing witnesses.

WILLIAM HENRY ROSE,
*Administrator of Henry Rose, deceased.*

Witnesses:
 ARTHUR A. GUNNING,
 THOS. N. COOK.